United States Patent [19]

Hinden

[11] 4,372,627
[45] Feb. 8, 1983

[54] RETRACTABLE DAMPER BEARING ASSEMBLY

[75] Inventor: Milton Hinden, Massapequa, N.Y.

[73] Assignee: Duro Dyne Corporation, Farmingdale, N.Y.

[21] Appl. No.: 320,322

[22] Filed: Nov. 12, 1981

[51] Int. Cl.³ ............................................. F16C 23/02
[52] U.S. Cl. .................... 384/260; 126/285 R
[58] Field of Search ............... 308/59, 58, 26; 126/285 R, 288, 290, 292

[56] References Cited

U.S. PATENT DOCUMENTS

| | | | |
|---|---|---|---|
| 1,480,949 | 1/1924 | Olinger | 126/292 |
| 1,937,708 | 12/1933 | Meyer | 126/292 |
| 2,090,605 | 8/1937 | Anderson | 126/292 |
| 2,249,329 | 7/1941 | Rosenberg | 126/285 R |

*Primary Examiner*—Lenard A. Footland
*Attorney, Agent, or Firm*—Mark T. Basseches; Paula T. Basseches

[57] ABSTRACT

The invention relates to a bearing assembly adapted to be connected to a damper blade, and particularly a damper blade intended to be disposed within the duct of an air conduit used in a heating or cooling system. The assembly is characterized in that the bearing pin is supplied in a first position, from which it may be partially retracted, and after installation may be shifted to an extended position from which, if necessary, it may likewise be retracted, making it particularly suitable for installations wherein the duct interior is provided with an insulating lining.

4 Claims, 6 Drawing Figures

U.S. Patent    Feb. 8, 1983    4,372,627
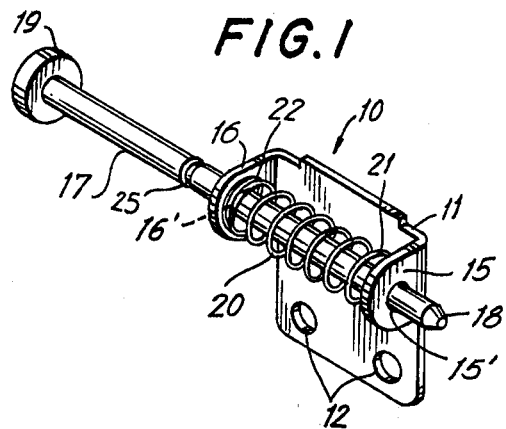
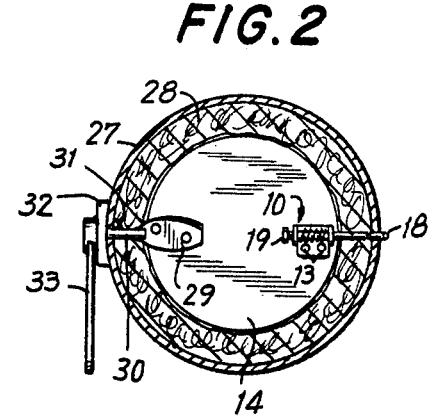
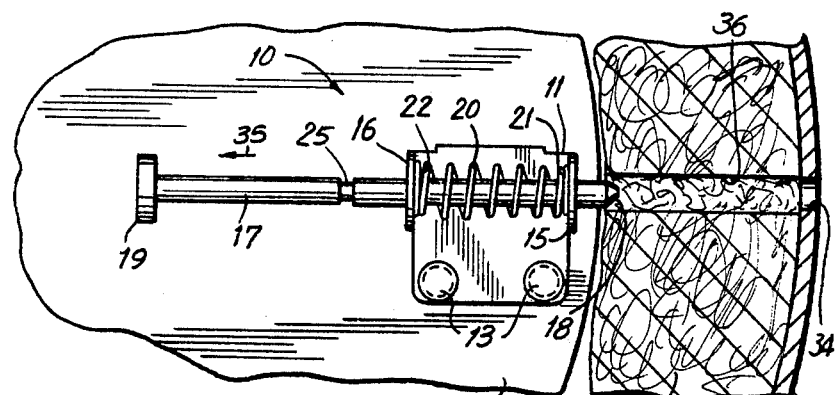
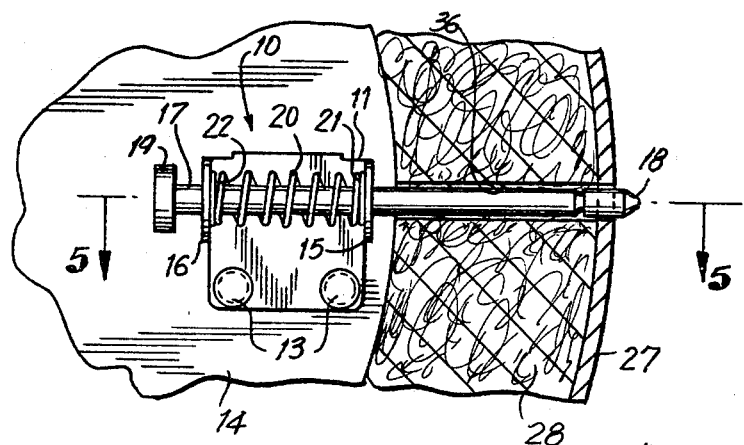
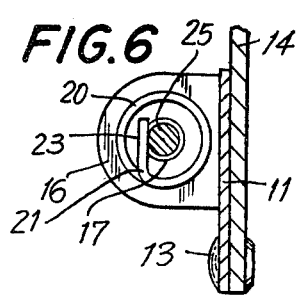
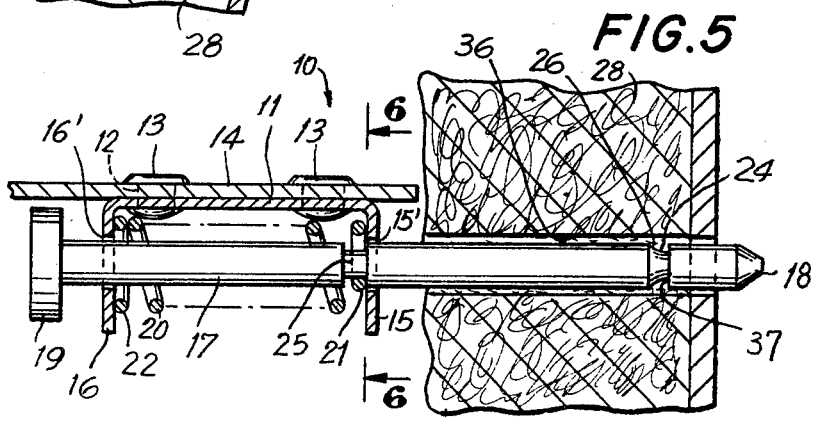

RETRACTABLE DAMPER BEARING ASSEMBLY

BACKGROUND OF THE INVENTION

1. Field of the Invention

The present invention is in the field of air conditioning and heating installations, and particularly relates to a bearing assembly for supporting the undriven end of a damper blade installed within an air duct or conduit.

2. The Prior Art

It is conventional in air conditioning and heating installations to provide in the various ducts or conduits a series of damper members which are typically adjusted so as to proportion the distribution of air within the system. The dampers generally are provided with a driven end, a. g. an end having a control shaft mounted in a fitting which may be adjusted by handle or motorized control. The opposite end of the blade is generally supported by a bearing component comprising a bracket adapted to be fixed to the blade and a projecting rod or pin adapted to extend through a bearing aperture formed in the duct or in a bearing fixture supported externally of the duct.

Mounting of the damper blade to the duct has generally involved passing the driven end or shaft affixed to the blade through an aperture formed in one wall of the duct, and thereafter inserting the blade to a position transversely of the duct and shifting the bearing pin into its bearing aperture coaxially located relative to the shaft mounting aperture.

As will be apparent from the foregoing description, if the blade provides a desirable close tolerance fit with the interior of the duct, the projecting bearing pin will interfere with the movement of the blade into the diametric position within the duct. In order to accommodate such positioning, it is conventional practice to supply a bearing pin which may be retracted against the force of a spring during the process of insertion and which will spring outwardly into the bearing aperture after the blade has been properly positioned. The degree of retractile movement necessary in a conventional duct installation is small due to the relatively inconsequential thickness of the duct, and it is necessary merely to retract the bearing pin an amount sufficient to clear such thickness.

Recently air conduit systems have been designed with pads or rolls of insulation affixed to the interior surface of ductware in order to improve the energy efficiency of the system. Since the insulation thickness is typically in the order of one inch or more, it will be apparent that a substantial retractile movement of the pin must be accommodated in order to permit the damper blade to be positioned within the duct.

Conventional damper bearing structures are incapable of the necessary retractile movement. Current installation techniques accordingly require that portions of the insulation be removed from the duct in line with the bearing aperture formed in the duct to provide clearance for bearing insertion. Obviously, the necessity for carving away insulation material, in addition to increasing the difficulties of installation, comprises to a degree the efficiency of the system and, in the case of air conditioning installations, leads to a situation wherein condensation forms on external metallic portions of the duct opposite the bare interior metal portions.

SUMMARY

The present invention may be summarized as directed to an improved damper bearing assembly which is susceptible of being spring retracted in each of two positions, namely, an "as shipped" position and an extended or "as mounted" position. The bearing assembly includes a bracket and mounting legs supporting a bearing pin or rod. A spring disposed between the legs is connected to the rod, enabling the rod to be partially withdrawn for movement of the blade into proper alignment in the duct. When in the aperture-aligned position, the pin may be shifted outwardly, whereby the spring is shifted from a first seat on the pin or rod to a second seat thereon, again permitting limited retraction of the rod.

It is accordingly an object of the invention to provide an improved retractable bearing assembly particularly intended to enable the facile mounting of a damper blade within a duct having an interior lining of insulating material, but also suitable for use in a conventional unlined duct.

A further object of the invention is the provision of a bearing assembly of the type described wherein the support rod is provided with two seat components, and the rod projecting spring may be shifted from one said seat component to the other responsive to outward movement of the rod.

To attain these objects and such further objects as may appear herein or be hereinafter set forth, reference is made to the accompanying drawings, forming a part hereof, in which:

FIG. 1 is a perspective view of a bearing assembly in accordance with the invention.

FIG. 2 is a cross-sectional view, on a reduced scale, showing a damper blade and associated supporting mechanism positioned within an internally insulated duct;

FIG. 3 is a fragmentary sectional view showing the position of the parts in the course of installation of a damper blade assembly, including the bearing member in an interim position in the course of insertion;

FIG. 4 is a view similar to FIG. 3 showing the position of the parts after insertion;

FIG. 5 is a horizontal section taken on the line 5—5 of FIG. 4;

FIG. 6 is a vertical section taken on the line 6—6 of FIG. 5.

Referring now to the drawings, there is shown in FIG. 1 a damper bearing assembly 10 comprising a mounting plate 11 having apertures 12 for accommodating fastener rivets 13 extending through the plate and through a damper blade 14 to be secured to the plate (see FIG. 2).

The plate 11 includes upstanding outer and inner legs or ears 15, 16, respectively, which are disposed perpendicular to the plate 11. The ears 15, 16 are provided with apertures 15', 16', respectively, which apertures are in coaxial alignment. A bearing rod member 17 is mounted through the apertures 15', 16', the rod including a free end portion 18 lying outwardly adjacent the outer leg 15. The opposite end of the rod 17 is headed as at 19. A helical spring member 20 is convoluted about the portion of the rod 17 lying between the legs 15, 16, the ends 21, 22 of the spring 20 reacting against legs 15, 16, respectively.

The end 21 of the spring 20 is provided at its endmost convolution with an inwardly deflected finger 23 defining a detent.

As is best apparent from FIGS. 4 and 5, the rod 17 is provided with outer and inner seat portions 24, 25, respectively. The outer seat portion 24 includes a cammed or chamfered annular wall portion 26 at the part furthest from the free end 18 of the rod. In contrast to the chamfer 26, it will be perceived that the annular seat 25 is defined by generally radially directed wall portions.

The device will now be described in combination with a duct assembly, best shown in FIG. 2.

The duct assembly includes a metallic outer wall 27 having an inner lining 28 of glass fiber insulation or the like.

The damper blade 14 is provided with a drive bracket 29 having a radially extending drive shaft 30. The bearing assembly 10 is secured to the blade 14 as by rivets 13 or like fasteners in such manner that the rod 17 is in coaxial alignment with the shaft 30.

The bearing assembly is mounted with the rod 17 in the retracted position shown in FIGS. 1 and 4. In such retracted position, the detent or finger 23 of the spring lies within the outer seat 24 of the rod, and it will thus be seen that the free end 18 projects only a short distance beyond the outer leg 15 of the assembly (FIG. 3).

With the parts thus disposed, the shaft 30 is passed outwardly through aperture 31 formed in the duct, through damper regulating mechanism 32, following which the damper regulator handle 33 may be secured to the shaft.

With the pin 17 in the retracted position described, the damper blade may now be moved inwardly so as to lie diametrically of the duct so as to align the axis of the rod 17 with the axis of aperture 34 formed in the wall of the duct 27 opposite aperture 31.

To enable the blade to be thus positioned without damage to the insulation, it is desirable to retract the pin 17 by movement of the head 19 in the direction of the arrow 35 (see FIG. 3), whereby the free end 18 is withdrawn essentially to the depth of the leg 15. With the parts positioned as shown in FIG. 3, the rod 17 may be released, permitting the spring to extend the rod partially, essentially to the position shown, whereat the pin 17 enters the aperture or clearanceway 36 in the insulation material.

As will be apparent from an inspection of FIG. 5, the outermost wall 37 of the outer seat 24 is radially directed and, thus, withdrawal of the rod 17 will not result in the detent 23 of the spring being unseated from the rod. However, the chamfer or cammed portion 26 of the seat 24 is angularly oriented to permit the detent 23 to be cammed clear of the seat responsive to outward movement of the rod 17.

With the parts aligned as shown in FIG. 4, the rod 17 is shifted outwardly, whereby the free end 18 thereof is caused to move outwardly through aperture 34 in the duct. The shifting movement is continued until the detent 23 enters into the inner seat 25. The rod will now be locked in its bearing position.

As will be apparent from the preceding description, the bearing device described is particularly useful since it enables positioning of the damper blade in an internally insulated duct. It will be further noted that the same device, without alteration, may be employed in a non-insulated duct environment. The fixture thus provides a universal bearing connector for damper blades which is effective in both insulated and non-insulated duct environments.

As will be apparent to those skilled in the art and familiarized with the instant disclosure, numerous variations in details of construction may be made without departing from the spirit of the invention. Accordingly, the same is to be broadly construed within the scope of the appended claims.

Having thus described the invention and illustrated its use, what is claimed as new and is desired to be secured by Letters Patent is:

1. A retractable damper bearing assembly for supporting the undriven end of a damper blade for rotation in a duct, and particularly an insulation lined duct, comprising a mounting plate adapted to be secured to said blade, inner and outer leg members extending from said plate in spaced parallel relation, each said leg member including an aperture, said apertures being disposed in coaxial alignment parallel to said plate, a bearing rod slidably extending through said apertures and having a free end portion, said rod being shiftable between a retracted position whereat said free end is disposed outwardly adjacent said outer leg and an extended position whereat said free end of said rod is displaced outwardly from said retracted position, a first seat portion on said rod, said seat portion in said extended position of said rod being disposed inwardly of said outer leg, a coil spring member convoluted about said rod, said spring member being disposed between and having its opposed ends bearing against said legs, detent means on said spring member adjacent said outer leg, said detent means being biased into engagement with said seat portion responsive to movement of said rod from said retracted to said extended position.

2. A bearing assembly in accordance with claim 1 wherein said detent means comprises an inwardly deflected convolution of said spring.

3. A bearing assembly in accordance with claim 2 and including a second seat portion on said rod at a position between said first seat portion and said free end, said detent means being releasably disposed in said second seat portion in said retracted position of said rod.

4. A bearing assembly in accordance with claim 3 wherein said first seat portion comprises an annular groove having generally radially extending sides, and said second seat portion comprises an annular groove on said rod, the surface of said groove of said second seat furthest from said free end including a cam shoulder whereby said detent means is cammed clear of said second seat portion responsive to movement of said rod from said retracted to said extended position.

* * * * *